United States Patent
Nicholls et al.

(10) Patent No.: US 10,115,160 B2
(45) Date of Patent: Oct. 30, 2018

(54) DYNAMIC CURRENCY CONVERSION SYSTEM AND METHOD

(71) Applicant: PAYMENTECH, LLC, Dallas, TX (US)

(72) Inventors: Michael K. Nicholls, Odessa, FL (US); Lester S. Maragh, Palm Harbor, FL (US); Joan DeTemple, Odessa, FL (US); Rosemary R. Thomas, Plano, TX (US); Zunoraine Holmes, Cedar Hill, TX (US); George E. Wilcox, Palm Harbor, FL (US); Keeley M. Sapienza, Tampa, FL (US); Lubna Shad, Clearwater, FL (US)

(73) Assignee: PAYMENTECH, LLC, Dallas, TX (US)

( * ) Notice: Subject to any disclaimer, the term of this patent is extended or adjusted under 35 U.S.C. 154(b) by 791 days.

(21) Appl. No.: 14/183,381

(22) Filed: Feb. 18, 2014

(65) Prior Publication Data
US 2014/0164155 A1    Jun. 12, 2014

Related U.S. Application Data

(60) Division of application No. 13/753,265, filed on Jan. 29, 2013, now Pat. No. 8,655,781, which is a
(Continued)

(51) Int. Cl.
*G06Q 30/00* (2012.01)
*G06Q 40/04* (2012.01)
(Continued)

(52) U.S. Cl.
CPC ......... *G06Q 40/04* (2013.01); *G06Q 20/04* (2013.01); *G06Q 20/10* (2013.01);
(Continued)

(58) Field of Classification Search
CPC ...................................................... G06F 17/60
(Continued)

(56) References Cited

U.S. PATENT DOCUMENTS

| 5,670,768 A | 9/1997 | Modiano et al. |
| 6,199,046 B1 | 3/2001 | Heinzle et al. |

(Continued)

OTHER PUBLICATIONS

Currency Conversion Positions for E-Cash; Schmerken, Ivy, Wall Street & Technology, New York: Sep. 1996, vol. 14, Iss. 9, p. 62.

*Primary Examiner* — John H. Holly
(74) *Attorney, Agent, or Firm* — Jackson Walker LLP; Christopher J. Rourk; Thomas B. Hayes (57) ABSTRACT

A system for dynamic currency conversion is provided. The system includes a bank identifier system determining whether currency conversion is available for a card-issuing bank of a presented card, such as by comparing a bank identifier from the card with a list or table of participating banks. An exchange rate system determines whether an exchange rate has expired, such as an exchange rate associated with the foreign currency of the card-issuing bank. The card holder is presented with an option for selecting a foreign currency transaction after it is determined that currency conversion is available for the card-issuing bank and that the exchange rate has not expired, such that the card holder does not need to see such information unless foreign currency processing is available.

20 Claims, 5 Drawing Sheets

Related U.S. Application Data continuation of application No. 10/992,959, filed on Nov. 19, 2004, now Pat. No. 8,364,584.

(60) Provisional application No. 60/523,640, filed on Nov. 20, 2003.

(51) Int. Cl.
| | |
|---|---|
| *G06Q 20/04* | (2012.01) |
| *G06Q 20/10* | (2012.01) |
| *G06Q 20/20* | (2012.01) |
| *G06Q 20/38* | (2012.01) |
| *G06Q 20/40* | (2012.01) |
| *G07F 7/08* | (2006.01) |

(52) U.S. Cl.
CPC ....... *G06Q 20/1085* (2013.01); *G06Q 20/208* (2013.01); *G06Q 20/381* (2013.01); *G06Q 20/4037* (2013.01); *G07F 7/08* (2013.01)

(58) Field of Classification Search
USPC ....... 705/16, 44, 1.1, 40, 65, 30, 39, 42, 43, 705/37; 455/466, 414; 235/381, 379
See application file for complete search history.

(56) References Cited

U.S. PATENT DOCUMENTS

| | | |
|---|---|---|
| 7,013,289 B2 | 3/2006 | Horn et al. |
| 7,219,832 B2 | 5/2007 | Fillinger et al. |
| 2002/0023053 A1* | 2/2002 | Szoc ................ G06Q 20/10 705/39 |
| 2002/0099656 A1* | 7/2002 | Poh Wong ............ G06Q 20/04 705/40 |

* cited by examiner

DYNAMIC CURRENCY CONVERSION SYSTEM AND METHOD

RELATED APPLICATIONS

This application claims priority to U.S. Provisional application 60/523,640, filed Nov. 20, 2003, which is hereby incorporated by reference for all purposes.

FIELD OF THE INVENTION

The present invention pertains to the field of payment systems, and more particularly to a system and method for dynamic currency conversion that allows the availability of currency conversion at a point of sale terminal and the availability of an exchange rate to be determined prior to presenting the card holder with the option of selecting a foreign currency transaction.

BACKGROUND

Systems for processing credit card transactions in a foreign (i.e. non-local) currency are known in the art. Such systems require the cardholder to be notified of the availability for processing of the transaction in the foreign currency. For example, prior art systems use a query method where the foreign currency can be entered in response to a prompt, such that every transaction receives the prompt, even transactions that are for local currency processing. Likewise, if an incorrect foreign currency code is entered, then the transaction will be submitted for processing the entered foreign and subsequently rejected, as whether or not the transaction is eligible for foreign currency processing is typically determined by the issuing bank at a remote location.

Thus, while providing a capability for processing of credit card transactions in a foreign currency exists, such processes are prone to error, and are also cumbersome in that the majority of transactions which will be processed in a local currency will receive a prompt for whether or not to process the transaction in a foreign currency.

SUMMARY OF THE INVENTION

In accordance with the present invention, a system and method for dynamic currency conversion are provided that overcome known problems with allowing multiple currency types to be provided at a point of sale terminal.

In particular, a system and method for dynamic currency conversion are provided that determine whether a card-issuing bank for a card that is presented for a transaction participates in a direct currency conversion program, and which also determines whether a valid exchange rate has been received for that currency before presenting the option to use the foreign currency for the transaction to the card holder or merchant.

In accordance with an exemplary embodiment of the present invention, a system for dynamic currency conversion is provided. The system includes a bank identifier system determining whether currency conversion is available for a card-issuing bank of a presented card, such as by comparing a bank identifier from the card with a list or table of participating banks. An exchange rate system determines whether an exchange rate has expired, such as an exchange rate associated with the foreign currency of the card-issuing bank. The card holder is presented with an option for selecting a foreign currency transaction after it is determined that currency conversion is available for the card-issuing bank and that the exchange rate has not expired, such that the card holder does not need to see such information unless foreign currency processing is available.

The present invention provides many important technical advantages. One important technical advantage of the present invention is a system and method for dynamic currency conversion that determines the proper currency and exchange rate before prompting a card holder to elect processing in a foreign currency. In this manner, initial processing on incorrect information is not performed, such as where a card holder requests processing in a currency that is not accepted by the card-issuing bank.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
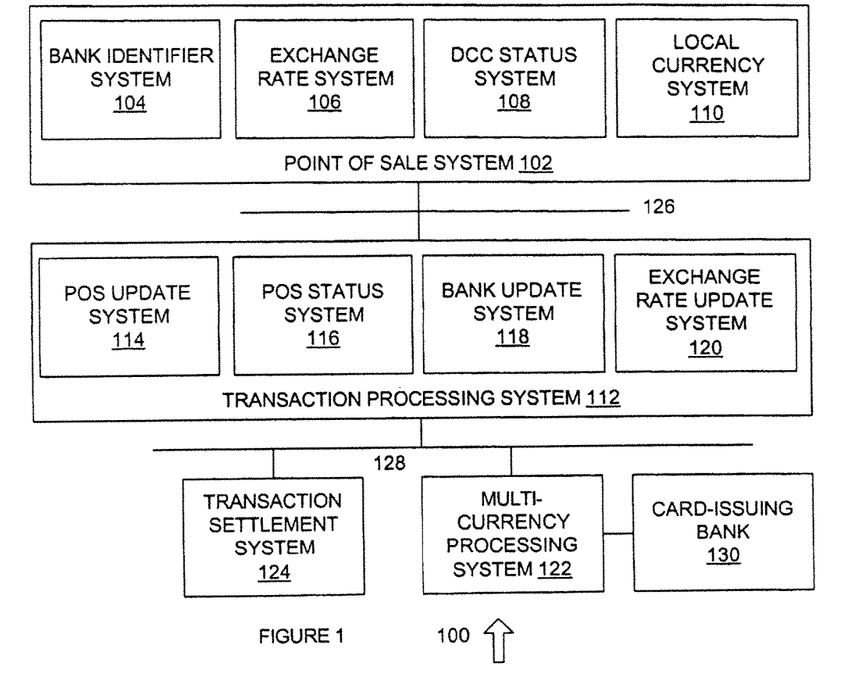
FIG. 1 is a diagram of a system for performing dynamic currency conversion from a point of sale credit or debit card processing terminal in according with an exemplary embodiment of the present invention.

FIG. 1 is a diagram of a system 100 for performing dynamic currency conversion from a point of sale credit or debit card processing terminal in according with an exemplary embodiment of the present invention. System 100 allows transactions to be processed in a local currency or in the home currency for a credit or debit card that was issued in a foreign currency.

System 100 includes point of sale system 102, which can be implemented in hardware, software, or a suitable combination of hardware and software, and which can be one or more software systems operating on a point of sale processing system that is configured to receive credit card data from a magnetic stripe, smart card reader, or other suitable credit card data. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application. Point of sale system 102 can also be implemented as a personal computing platform, a merchant e-commerce server that interfaces with personal computing platforms, or other suitable platforms.

Point of sale system 102 is coupled to transaction processing system 112 through communications medium 126. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications media can be a local area network, a wide area network, a public network such as the Internet, the public switched telephone network, a wireless network, a fiber optic network, other suitable media, or a suitable combination of such media.

Transaction processing system 112 can be implemented in hardware, software, or a suitable combination of hardware and software, and can be one or more software systems operating on a general purpose server platform. Transaction processing system 112 receives credit or debit card data, purchase data and other transaction data from point of sale system 102, and processes the transaction, such as by presenting the credit or debit card data, the purchase amount data and other suitable data to the card issuing bank for authorization, and by interacting with a transaction settlement system or performing transaction settlement where suitable.

Point of sale system 102 includes bank identifier system 104, exchange rate system 106, DCC status system 108, and local currency system 110, each of which can be implemented in hardware, software, or a suitable combination of hardware and software, and which can be one or more software systems operating on a point of sale system. Bank identifier system 104 includes a list of bank identification numbers that identify card issuing banks, and additional information as needed to allow dynamic currency conversion of the purchase amount into the foreign currency associated with the card issuing bank. Bank identifier system 104 can also interface with exchange rate system 106, DCC status system 108, and local currency system 110 as needed.

Exchange rate system 106 provides exchange rate data in response to a query for an exchange rate for a foreign currency as compared to a local currency. Exchange rate system 106 thus can interface with bank identifier system 104, DCC status system 108, local currency system 110, or other suitable systems to provide exchange rate data.

DCC status system 108 generates dynamic currency conversion status data, such as in response to a request for approval for dynamic currency conversion processing, in response to a query from transaction processing system 112, or other suitable DCC status data. In one exemplary embodiment, DCC status system 108 can inhibit a dynamic currency conversion transaction, such as to avoid wasting the time of the merchant and cardholder when dynamic currency conversion is not available, or can perform other suitable processes.

Local currency system 110 provides local currency data for use in determining whether a transaction is authorized for dynamic currency conversion to a foreign currency, such as the local currency associated with the point of sale system, multiple local currencies associated with the point of sale system, local currencies associated with a nationality or location in which the point of sale operates, or other suitable local currency data. In one exemplary embodiment, currency identifiers can be used instead of location identifiers, such as for comparison with currency identifiers associated with the issuing bank instead of location identifiers associated with the issuing bank, so as to avoid situations arising from multiple currencies available locally, multiple currencies available from the foreign issuing bank, or other situations where comparison of country codes would not provide sufficient data for processing a dynamic currency conversion transaction.

Transaction processing system 112 includes point of sale update system 114, point of sale status system 116, bank update system 118, and exchange rate update system 120, each of which can be implemented in hardware, software, or a suitable combination of hardware and software, and which can be one or more software systems operating on a general purpose server platform. Point of sale update system 114 receives point of sale update data and interfaces with each point of sale system 102 of a plurality of point of sale systems 102 to provide point of sale updates. In one exemplary embodiment, point of sale update system 114 can provide bank identifying number tables, foreign exchange tables, local currency tables, functional programs that enable a point of sale system 102 to process dynamic currency conversion transactions, or other suitable update data. Likewise, point of sale update system 114 can store status identification data for each point of sale system 102 serviced by transaction processing system 112, such that the status of each point of system 102 can be determined, verified, or that other suitable processes can be performed.

Point of sale status system 116 can change status for an individual point of sale system 102, all point of sale systems 102 for a given merchant, or other suitable point of sale statuses, such as based on the availability or unavailability of multicurrency processing system 122, participation of a merchant in a dynamic currency conversion program, fraud indicators occurring at a specific point of sale system 102 associated with dynamic currency conversion transactions, or other suitable data. In one exemplary embodiment, point of sale status system 116 can also receive the bank identification data, exchange rate data, or other suitable data, and can transmit a status identifier to a point of sale system 102 regarding the availability of dynamic currency conversion for that point of sale system 102, such as where the point of sale system 102 does not include the bank identifier system 104 or exchange rate system 106. In this exemplary embodiment, the functions performed by bank identifier system 104 and exchange rate system 106 can be performed by point of sale status system 116 or other suitable systems.

Bank update system 118 receives bank identifier data updates from multicurrency processing system 122 or other suitable sources, and provides the bank identifier data to bank identifier system 104, point of sale status system 116 (where point of sale status system 116 performs the functions of bank identifier system 104), or other suitable systems. Bank update system 118 can query multicurrency processing system 122 or other suitable systems for updates, can receive the updates from one or more predetermined sources on a scheduled basis, or other suitable processes can be used to provide bank identifiers to bank update system 118. In this manner, banks participating in foreign currency conversion can be updated so as to ensure that foreign currency conversion transactions are not provided for banks that are not accepting such transactions. In another exemplary embodiment, transaction processing system 112 can directly communicate with card-issuing banks 130, such that processes performed by multicurrency processing system 122 are performed by transaction processing system 112.

Exchange rate update system 120 receives exchange rate data, such as from multicurrency processing system 122 or other suitable sources, and can further provide a period of time for which the exchange rate will be considered valid. In one exemplary embodiment, exchange rate update system interfaces with exchange rate system 106, point of sale status system 116, or other suitable systems to provide a period of time for which a given exchange rate will be considered valid. In this manner, exchange rate update system 120 ensures that the exchange rate being used for dynamic currency conversion transactions reflects an accurate exchange rate such that changes or fluctuations in exchange rates do not result in significant losses to the operator of transaction processing system 112, the operator of point of sale system 102, multicurrency processing system 122, or other parties that may be contractually required to guarantee the exchange rate.

Transaction processing system 112 is coupled to multicurrency processing system 122 and transaction settlement system 124 via communications medium 128, which can be the same as communications medium 126, separate communications media, or other suitable communications media. Multicurrency processing system 122 can be implemented in hardware, software, or a suitable combination of hardware and software, and can be one or more software systems operating on a general purpose server platform. Multicurrency processing system 122 performs multicurrency processing for transaction processing system 112. In one exemplary embodiment, transaction processing system 112 can also perform the functions of multicurrency processing system 122, or multicurrency processing system 122 can be a separate entity that performs multicurrency processing for a plurality of transaction processing systems 112. Likewise, other suitable configurations can be used. Multicurrency processing system 122 receives credit or debit card data, purchase price data, and other suitable data and interfaces with one or more card-issuing banks 130 to provide authorization data for a transaction. In one exemplary embodiment, multicurrency processing system 122 includes suitable connections to card-issuing banks 130 in foreign locations such that automatic verification of account balances associated with a credit or debit account can be determined, so that when a purchase amount is submitted for approval, that purchase amount can be verified against the remaining credit or debit limit on the account, the credit or debit limit of the account can be updated to reflect the purchase, or other suitable processes can be performed. Likewise, multicurrency processing system 122 can provide an indicator to such foreign banks or other suitable systems that the transaction has been cancelled (such as to increase the amount of credit available), the transaction has been completed (such as to place a hold on the funds allocated for the credit transaction) or other suitable processes can be used.

Transaction settlement system 124 receives transaction data from transaction processing system 112 and performs settlement processes. In one exemplary embodiment, transaction settlement system 124 tracks each transaction after it is performed to determine whether a dispute has been filed. Transaction settlement system 124 can include a multicurrency processing system 122 interface system, such that transaction settlement system 124 can process a new record type for transactions that are direct currency transactions to identify the transactions, route them to the multicurrency processing system 122, and to receive transactions from the multicurrency processing system 122, such as disputed charges, requests for transaction information in order to verify transactions, or other suitable processes. In this manner, transaction processing system 112 does not need to be involved with communications between transaction settlement system 124 and multicurrency processing system 122 unless needed. Likewise, transaction processing system 112 can alternately perform the functions of transaction settlement system 124, where suitable.

In operation, system 100 allows dynamic currency conversion to be provided at a point of sale system 102 in a manner that does not require each transaction to indicate to the cardholder whether a dynamic currency conversion is requested, and in a manner that prevents incorrect data from being provided in response to a request for dynamic currency conversion transaction, such as where the card issuing bank does not recognize the currency or the dynamic currency conversion transaction has not been approved for a particular merchant, bank, exchange rate, or in other suitable situations. System 100 further provides exchange rate control by associating a time period with each exchange rate, such that the availability of an exchange rate can be used to set the dynamic currency conversion status for a point of sale system.

Figure 2:
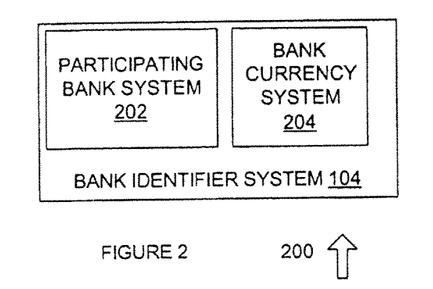
FIG. 2 is a diagram of a system for providing bank identification data in accordance with an exemplary embodiment of the present invention.

FIG. 2 is a diagram of a system 200 for providing bank identification data in accordance with an exemplary embodiment of the present invention. System 200 includes bank identifier system 104, participating bank system 202 and bank currency system 204, each of which can be implemented in hardware, software, or a suitable combination of hardware and software, and which can be implemented on a point of sale processing system, a general purpose server platform hosting a transaction processing system, or other suitable systems.

Participating bank system 202 provides participating bank data in response to a query, such as a query of a bank identifier from a credit or debit card or other suitable queries. In one exemplary embodiment, participating bank system 202 can include bank identification number (BIN) tables, or other suitable data that identifies the issuing bank for a given credit card. Likewise, participating bank system 202 can include additional data, such as location data, status data, or other suitable data. Participating bank system 202 can also interface with an update system, such as bank update system 118 or other suitable update systems, such as by querying the update system, by receiving a broadcast update, by receiving a point of sale system 102 or other system-specific update, or in other suitable manners.

Bank currency system 204 includes one or more currencies associated with an issuing bank, such as in a table stored in participating bank system 202, or other suitable issuing banks. In one exemplary embodiment, bank currency system 204 can include a currency associated with a location, can include one or more currencies associated with the given issuing bank, or other suitable currency data. Bank currency system 204 can also interface with an update system, such as bank update system 118 or other suitable update systems, such as by querying the update system, by receiving a broadcast update, by receiving a point of sale system 102 or other system-specific update, or in other suitable manners.

In operation, system 200 allows a bank that is identified by a bank identification number or other suitable data to determine whether the bank is participating in a dynamic currency conversion program offered through the point of sale system 102. System 200 can be hosted at the point of sale system, at a transaction processing system 112, or in other suitable locations, and allows a determination to be made of whether a credit or debit card is authorized for dynamic currency conversion processing prior to querying the cardholder to determine whether dynamic currency conversion transactions are requested or desired. Likewise, system 200 allows the currency for the dynamic currency conversion to be determined based on the currency of the issuing bank, so that currencies other than those which could be processed are not inadvertently entered, so that time is not wasted requesting currency conversion information for cards that are not authorized for dynamic currency conversion or for issuing banks that are not processing in foreign currencies, or in other similar situations where prior art systems result in wasted time and merchant/customer frustration.

Figure 3:
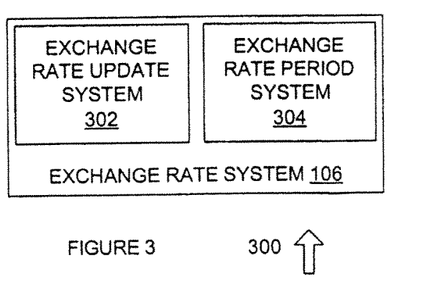
FIG. 3 is a diagram of a system for providing exchange rate functionality in accordance with an exemplary embodiment of the present invention.

FIG. 3 is a diagram of a system 300 for providing exchange rate functionality in accordance with an exemplary embodiment of the present invention. System 300 includes exchange rate system 106, exchange rate update system 302 and exchange rate period system 304, each of which can be implemented in hardware, software, or a suitable combination of hardware and software, and which can be implemented as one or more software systems on a point of sale processing system, a general purpose server platform hosting a transaction processing system, or other suitable systems.

Exchange rate update system 302 receives one or more exchange rate updates with which a point of sale system 102 or other suitable systems can perform dynamic currency conversion. In one exemplary embodiment, exchange rate update system 302 can include a table of exchange rates, such as for conversion from a first currency to a second currency, or other suitable exchange rate conversion data. Exchange rate update system 302 can likewise query an exchange rate update system 120 hosted on a transaction processing system 112, can be hosted on or performed by a point of sale status system 116, or other suitable processes can be used.

Exchange rate period system 304 receives exchange rate period data associated with an exchange rate in a table or other suitable exchange rate identifiers of exchange rate update system 302. In one exemplary embodiment, exchange rate period system 304 can include an exchange rate and time associated with the exchange rate for given an exchange rate transaction, such that the exchange rate will be used for such transactions submitted for processing within that time period. Exchange rate period system 304 can likewise interface with an exchange rate update system 120 over a transaction processing system 112, can be hosted on a point of sale status system 116, or other suitable processes can be used to allow exchange rate periods for dynamic currency conversion at a point of sale terminal or in other suitable locations to be provided.

In operation, exchange rate system 300 allows an exchange rate associated with a dynamic currency conversion transaction to be determined, and for such exchange rates to be controlled so as to prevent stale exchange rates from being used, to insure that the exchange rate that is represented to the customer is the exchange rate that is used in the transaction settlement process, and for other suitable purposes. System 300 can be implemented in a point of sale system, in a transaction processing system, or in other suitable locations so as to allow exchange rates to be provided that are current and relevant to the issuing bank of a credit or debit transaction.

Figure 4:
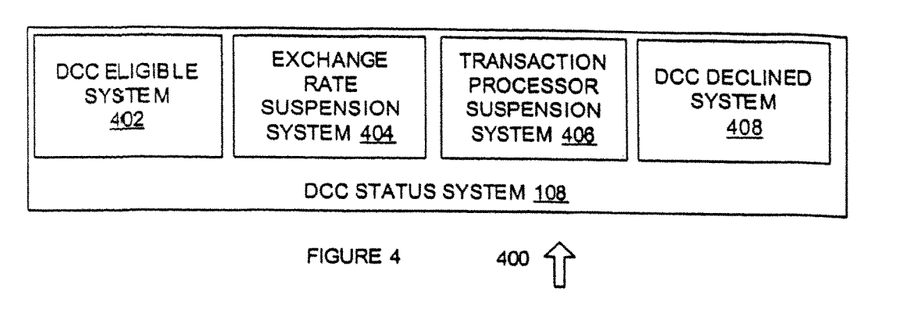
FIG. 4 is a diagram of a system for providing currency conversion status in accordance with an exemplary embodiment of the present invention.

FIG. 4 is a diagram of a system 400 for providing currency conversion status in accordance with an exemplary embodiment of the present invention. System 400 includes DCC status system 108 and DCC eligible system 402, exchange rate suspension system 404, transaction processor suspension system 406, and DCC decline system 408, each of which can be implemented in hardware, software, or a suitable combination of hardware and software, and which can be one or more software systems operating on a point of sale system 102, a transaction processing system 112, a general purpose server platform, or other suitable processes or systems.

DCC eligible system 402 determines whether a credit or debit card presented at a point of sale terminal is eligible for dynamic currency conversion. In one exemplary embodiment, DCC eligible system 402 can read a bank identifier from a credit or debit card and determine whether the bank identifier is on a list, stored in a table of eligible banks for dynamic currency conversion, stored in a table of banks that are not eligible for dynamic currency conversion, is on a table of banks for which dynamic currency conversion has been suspended, or other suitable status data. DCC eligible system 402 generates DCC eligible status data, such that a dynamic currency conversion transaction can be suspended if it is determined from DCC eligible system 402 that the credit or debit card is not eligible for dynamic currency conversion transactions.

Exchange rate suspension system 404 determines whether a dynamic currency conversion transaction should be suspended based on exchange rate expiration data, exchange rate incompatibility data, or other suitable exchange rate data. In one exemplary embodiment, exchange rate suspension system 404 determines whether an exchange rate period, such as provided by exchange rate system 304, has expired, such that the exchange rate associated with the dynamic currency conversion for a given credit card is no longer valid to be recognized by the card issuing bank. Exchange rate suspension system 404 can generate suspension data for a dynamic currency conversion transaction, such as before the card user or owner is presented with the option for a dynamic currency conversion transaction, so as to avoid creating the need to perform additional processes when dynamic currency conversion is not available. Likewise, exchange rate suspension system 404 can generate query data requesting an update for an exchange rate that has been determined to be expired, or other suitable processes can be performed.

Transaction processor suspension system 406 receives transaction processor suspension data and suspends the dynamic currency conversion processes for a given point of sale system, a given merchant, a given issuing bank, a given currency type, or other suitable suspension criteria. In one exemplary embodiment, when system 400 is implemented on a point of sale system 102, transaction processor suspension system 406 can receive transaction processor suspension status data, such as when a transaction processing system 112 determines that dynamic currency conversion is no longer available due to loss of connection with multicurrency processing system 122, due to a number of fraudulent transactions at a given point of sale system 102, or in other suitable situations.

DCC decline system 408 presents a DCC available indicator, query or prompt to a cardholder and receives DCC accepted or declined data. In one exemplary embodiment, DCC decline system 408 can return a DCC decline status when the cardholder is presented with the current exchange rate and any other associated fees for accepting the transaction in the given foreign currency at the given exchange rate. Likewise, DCC decline system 408 can receive status data from DCC eligible system 402, exchange rate suspension system 404, transaction processor suspension system 406, or other suitable systems, such that a cardholder is not presented with the option of accepting or declining the dynamic currency conversion for a transaction if dynamic currency conversion is not available, has been suspended, or otherwise would not be allowed. Likewise, DCC decline system 408 receives exchange rate data associated with the issuing bank, such that the user or cardholder does not need to select a currency, provide a currency identifier, or otherwise run the risk of providing incorrect information that results in a transaction not being processed because the cardholder provides incorrect currency data for the card issuing bank.

In operation, system 400 allows dynamic currency conversion status to be controlled in a manner that prevents dynamic currency conversion processes from being initiated where they are not allowed because of the issuing bank not being a participating bank of the dynamic currency conversion program, where a multicurrency processor is unavailable for processing dynamic currency conversion transactions, where the point of sale terminal or merchant is temporarily suspended from processing eligible direct currency transactions, or in other suitable situations. System 400 can be implemented on a point of sale system, a transaction processing system, or other suitable systems, helps to minimize situations where a cardholder is presented with the option of a dynamic currency conversion transaction, and eliminates situations where a cardholder provides incorrect data regarding the types of currency that are available for dynamic currency conversion transactions, thus avoiding unnecessary processing of such incorrect data.

Figure 5:
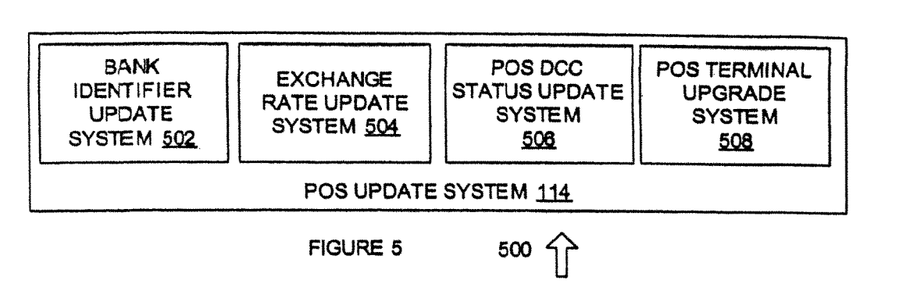
FIG. 5 is a diagram of a system for providing a point of sale system update in accordance with an exemplary embodiment of the present invention.

FIG. 5 is a diagram of a system 500 for providing a point of sale system update in accordance with an exemplary embodiment of the present invention. System 500 includes point of sale update system 114 and bank identifier update system 502, exchange rate update system 504, point of sale DCC status update system 506, and point of sale terminal upgrade system 508, each of which can be implemented in hardware, software, or a suitable combination of hardware and software, and which can be one or more software systems operating on a transaction processing system 112 general purpose server platform.

Bank identifier update system 502 receives bank identifier update data and distributes the bank identifier update data to one or more bank identifier systems 104, such as on individual point of sale system 102, in a transaction processing system 112 or in other suitable locations. In one exemplary embodiment, bank identifier update system 502 interfaces with a multicurrency processing system 122 or other suitable systems and receives an updated list of bank identification numbers or other suitable data that identifies banks that are participating in a dynamic currency conversion program. Likewise, bank identifier update system 502 can query individual banks, can query multicurrency processing system 122, or can otherwise update the list or table of bank identifiers. Bank identifier update system 502 can also update the bank identifier table or other suitable data on a bank identifier system 104 of a point of sale system 102 for a single point of sale system, for all point of sale systems for a merchant, can respond to queries from a bank identifier system 104 of a point of sale system 102 for an updated list, or can otherwise update the point of sale system 102 bank identifier system 104.

Exchange rate update system 504 receives exchange rate update data from a multicurrency processing system 122 or other suitable systems or sources and provides the exchange rate data to one or more exchange rate systems 106 at a point of sale system 102, a transaction processing system 112, or other suitable systems. In one exemplary embodiment, exchange rate update system 504 can assign a time limit based on existing agreements with multicurrency processing system 122, card issuing banks, or other suitable parties, exchange rate update system 504 can assign a uniform expiration time period for all exchange rate updates, or other suitable processes can be used to provide a period of time for which the exchange rate can be used. Likewise, exchange rate update system 504 can update exchange rates upon expiration of the exchange rate, such as where transaction processing system 112 guarantees the exchange rate, or other suitable processes can be used.

Point of sale DCC status update system 506 provides dynamic currency conversion status update to a point of sale system 102, such as a DCC status system 108 operating on a point of sale system 102. In one exemplary embodiment, point of sale DCC status update system 506 can perform all status update functions performed by system 400. Likewise, point of sale DCC status update system 506 can update a single point of sale system 102 DCC status, can update the status for all point of sale systems 102 for a given merchant update status, or can update other suitable status identifiers based on merchant participation in a dynamic currency conversion program, indicators of fraud, unavailability of a multicurrency processing system 122, or other functions.

Point of sale terminal upgrade system 508 receives point of sale data or software systems and performs upgrade functions on point of sale systems 102. In one exemplary embodiment, point of sale terminal upgrade system 508 can include data defining the configuration of each point of sale system 102 managed by transaction processing system 112, and can apply upgrades on a daily basis, in accordance with a predetermined sequence, based on the configuration data, or in other suitable manners.

In operation, system 500 allows a transaction processing system 112 or other suitable systems to upgrade one or more point of sale systems. System 500 allows bank identifiers, exchange rates, status, or operating functionality to be upgraded at point of sale terminals on an individual basis, on a merchant-by-merchant basis, or in other suitable manners.

Figure 6:
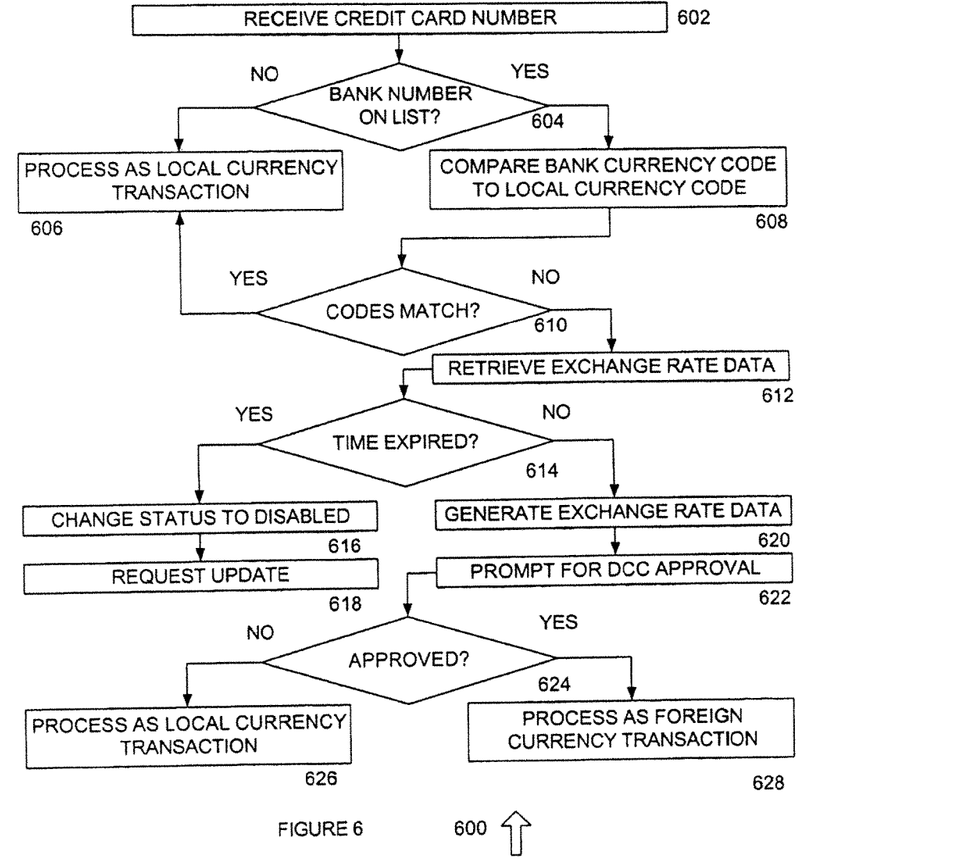
FIG. 6 is a flow chart of a method for providing dynamic currency conversion at a point of sale terminal in accordance with an exemplary embodiment of the present invention.

FIG. 6 is a flow chart of a method 600 for providing dynamic currency conversion at a point of sale terminal in accordance with an exemplary embodiment of the present invention. Method 600 begins at 602 where a credit or debit card number is received. In one exemplary embodiment, the card can be received at a point of sale terminal, transmitted from the point of sale terminal to a transaction processing system 112, or otherwise presented. The method then proceeds to 604.

At 604 it is determined whether a bank number from the credit or debit card number is on the list. If it is determined that the bank number is not on the list the method proceeds to 606 where the transaction is processed as a local currency transaction. Otherwise, if it is determined at 604 that the bank number is on a list of banks participating in a dynamic currency conversion program, then the method then proceeds to 608 where the bank currency code is compared to a local currency code. In one exemplary embodiment, bank currency codes and local currency codes can be used to avoid situations where multiple currency codes exist for a given bank or where multiple currency codes apply to the local currency. Likewise, country identifiers or other suitable identifiers can be used to determine whether the bank currency code matches the local currency code, or other suitable processes can be used. The method then proceeds to 610.

At 610 it is determined whether the codes match. If the codes do not match the method proceeds to 612, otherwise the method proceeds to 606 where the transaction is processed as a local currency transaction.

At 612 exchange rate data is retrieved, such as from a table of exchange rate data, an associated expiration time for an exchange rate, and other suitable exchange rate data. The method then proceeds to 614 where it is determined whether the time associated with the exchange rate has expired. If the time has expired the method proceeds to 616 where the status is changed to disabled. In one exemplary embodiment, the status at a point of sale system DCC status system 108 can be changed, a transaction processing system point of sale status system 116 can change the status to disabled, or other suitable processes can be performed. The method then proceeds to 618 where an update is requested for the expired exchange rate.

If it is determined at 614 that the time associated with the exchange rate period has not expired, the method proceeds to 620 where exchange rate data is generated. In one exemplary embodiment, the exchange rate data can include the foreign currency required for the transaction based on the exchange rate conversion rate between the local currency and the foreign currency. In addition, any additional charges such as transaction charges associated with performing the transaction in a dynamic currency conversion mode are generated and the method proceeds to 622.

At 622 the cardholder is prompted for dynamic currency conversion approval. In one exemplary embodiment, this prompt is transmitted from transaction processing system 112 to the point of sale system 102. Likewise, where method 600 is performed at the point of sale system, this prompt can be generated locally, or other suitable processes can be used. The method then proceeds to 624.

At 624 it is determined whether the cardholder has approved the transaction for dynamic currency conversion. If the cardholder declines dynamic currency conversion, the method proceeds to 626 where the transaction is processed as a local currency transaction. Otherwise, the method proceeds to 628 where the transaction is processed as a foreign currency transaction using the exchange rate presented to the cardholder.

In operation, method 600 allows dynamic currency conversion to be performed without involving the cardholder or the merchant until after it has been determined whether dynamic currency conversion is available, what the currency conversion rate is, or whether any other status conditions exist that would prohibit the dynamic currency conversion from transaction from being completed. In this manner, dynamic currency conversion transactions can be controlled, the number of improper transactions can be minimized, and cardholders and merchants are not involved with processes until after it is determined that dynamic currency conversion can occur.

Figure 7:
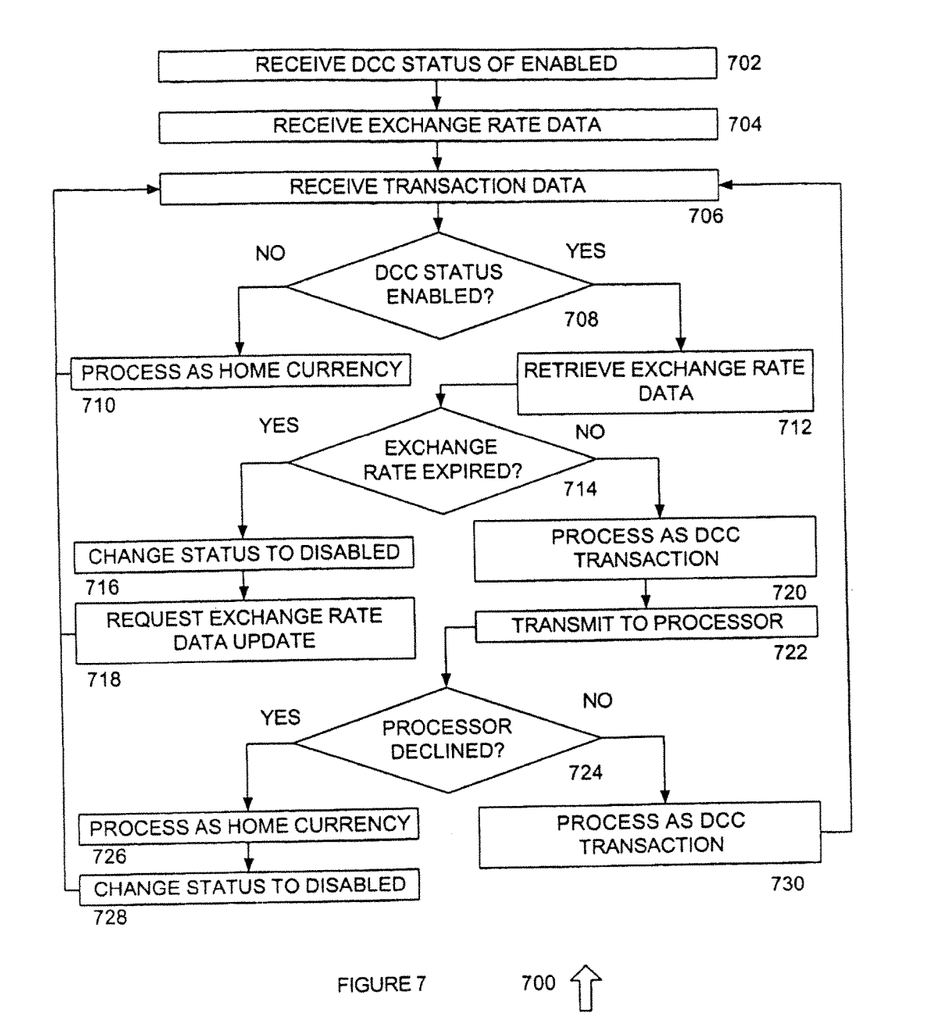
FIG. 7 is a flow chart of a method for managing status data for dynamic currency conversion in accordance with an exemplary embodiment of the present invention.

FIG. 7 is a flow chart of a method 700 for managing status data for dynamic currency conversion in accordance with an exemplary embodiment of the present invention. Method 700 can be performed locally at a point of sale system 102, at a transaction processing system 112, or other suitable combination of locations.

Method 700 begins at 702 where a DCC status of "enabled" is received. In one exemplary embodiment, the DCC status is received at a point of sale system, or is transmitted to a point of sale system from a transaction processing system 112. The method then proceeds to method 704.

At 704 exchange rate data is received. The exchange rate data can also include a time period associated with the exchange rate. Furthermore, the exchange rate data can be stored in a table, or otherwise updated in a suitable location. The method then proceeds to 706.

At 706 transaction data is received. The method then proceeds to method 708 where it is determined whether DCC status has been enabled for the point of sale terminal. If it is determined at 708 that DCC status has not been enabled the method proceeds to 710 and the transaction is processed as a local currency transaction. Otherwise, the method proceeds to 712 where the exchange rate data is retrieved. The method then proceeds to method 714 where it is determined whether the exchange rate has expired based on the time data associated with the exchange rate. If the exchange rate has expired the method then proceeds to 716 where the status is changed to disabled and the method then proceeds to 718 where a request for a new exchange rate data update is generated. The method then returns to method 706. If it is determined at 714 that an exchange rate period has not expired the method proceeds to 720.

At 720 the transaction is processed as a dynamic currency conversion transaction. In one exemplary embodiment, the dynamic currency conversion transaction can include prompting the cardholder to provide authorization for processing the transaction as a dynamic currency conversion transaction and receiving the authorization. The method then proceeds to 722 where the transaction is transmitted to a processor, such as a multicurrency processor that can perform transactions processing other than local currencies, a card-issuing bank, or other suitable locations. The method then proceeds to 724.

At 724 it is determined whether the processor has declined the transaction, such as due to fraud indicators, expired exchange rates, or other problems. If the processor has not declined the transaction the method then proceeds to 730 where the transaction is processed as a dynamic currency conversion transaction. The method then returns to 706 where new transaction data is awaited. Otherwise if it is determined at 724 that the processor has declined the transaction, the method proceeds to 726 where the transaction is processed as a local currency transaction. The method then proceeds to 728 where the status for the processor is changed to disabled. In one exemplary embodiment, the status can be changed to disabled for all point of sale systems based on the unavailability of a multicurrency processing system, it can be changed to disabled for all point of sale systems for a merchant based on a decline from the multicurrency processing system 122 due to the merchant, or other suitable processes can be performed. The method then returns to 706 where additional transaction data is received.

In operation, method 700 allows status data for a dynamic currency conversion system to be processed, so as to control the status of dynamic currency conversion from one or more point of sale systems, based on one or more merchants, based on fraud data, multicurrency processing system unavailability, exchange rate expiration, or other suitable factors. In this manner, method 700 allows multicurrency dynamic currency conversion processes to be performed without requiring input from a merchant or cardholder until after it has been determined that the status for the multicurrency dynamic currency conversion transaction has been approved.

Figure 8:
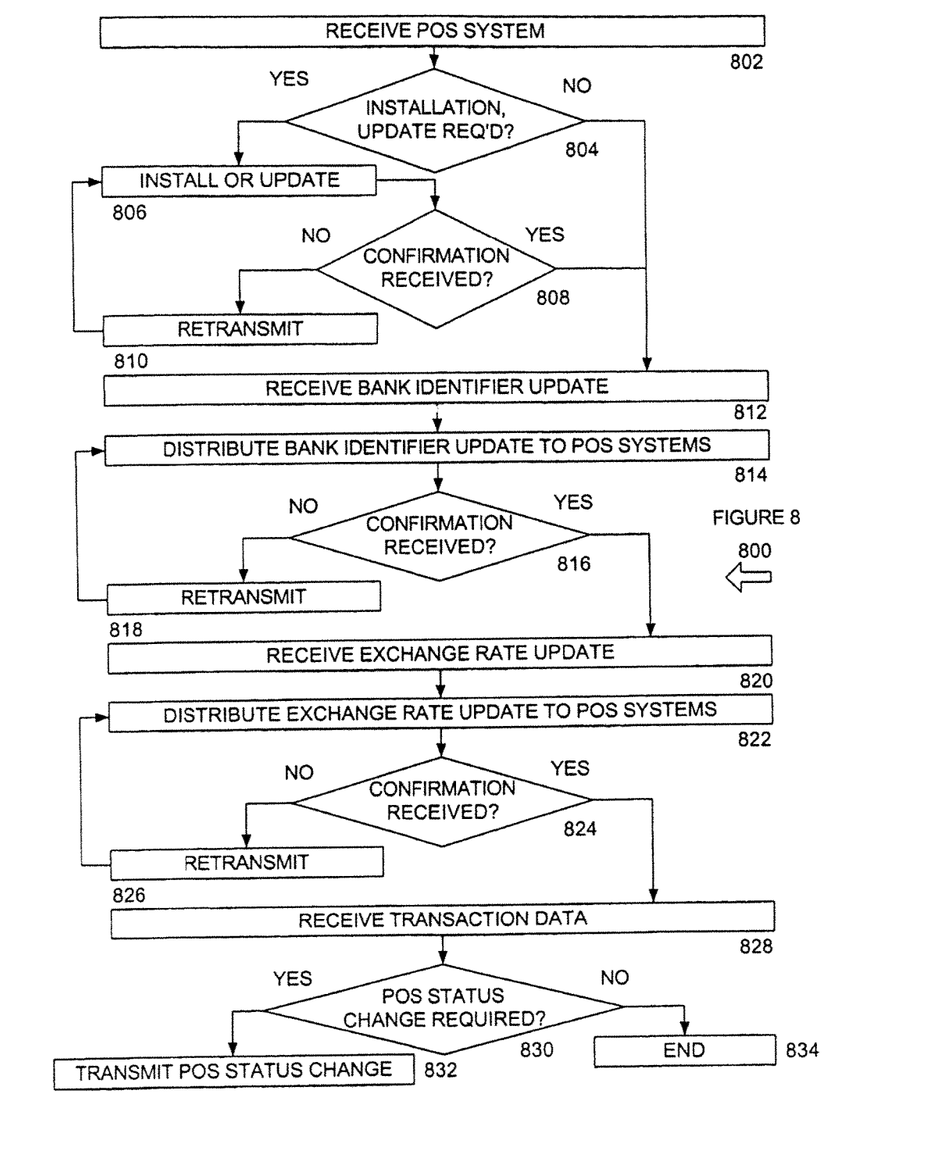
FIG. 8 is a flow chart of a method for updating a point of sale system in accordance with an exemplary embodiment of the present invention.

FIG. 8 is a flow chart of a method 800 for updating a point of sale system in accordance with an exemplary embodiment of the present invention. Method 800 begins at 802 where the point of sale system is received. The point of sale system can include one or more individual point of sale systems, the point of sale systems for a merchant, a point of sale operating system that includes one or more additional systems, or other suitable point of sale systems. The method then proceeds to 804.

At 804 it is determined whether an installation update is required. If it is determined at 804 that an installation update is not required the method proceeds to 812. Otherwise the method proceeds to 806 where the point of sale system is installed, an installation update is performed, or other suitable processes are performed. The method then proceeds to 808 where it is determined whether confirmation has been received. In one exemplary embodiment, confirmation can be received from the point of sale system that the installation has been completed, a task can be performed on the point of sale system to confirm that the installation or update has been completed, or other suitable processes can be performed. If confirmation is received the method proceeds to 812, otherwise the method proceeds to 812 where the installation update is retransmitted. The method then proceeds to 806.

At 812 bank identifier update data is received. In one exemplary embodiment, the bank identifier update data can be stored locally at the point of sale system 102 or in other suitable locations. The method then proceeds to 814 where the bank identifier update data is distributed to point of sale systems. In one exemplary embodiment, the bank identifier update can be distributed to point of sale systems based on merchant, based on a predetermined sequence for updating point of sale systems, based upon a response to a query from a point of sale system, based on point of sale system configuration data stored at the transaction processing system 112, or in other suitable manners. The method then proceeds to 816.

At 816 it is determined whether confirmation has been received, such as confirmation that the bank identifier tables have been replaced with new bank identifier tables, whether a response to a query to the point of sale system for the new bank identifiers has resulted in the proper identifier, or other suitable data. If it is determined that confirmation has not been received the method proceeds to 818 where the bank identifier update is retransmitted to the point of sale system. Otherwise the method proceeds to 820.

At 820 an exchange rate update is received, such as at a transaction processing system 112 from a multicurrency processing system 122 automatically or in response to a query, by directly querying exchange rate sources, or in other suitable manners. The method then proceeds to 822 where the exchange rate update is distributed to point of sale systems, such as according to a predetermined sequence, based on a merchant classes for a point of sale systems, based on point of sale system configuration data stored at transaction processing system 112, or another suitable processes may be used. The method then proceeds to 824 where it is determined whether a confirmation has been received. If confirmation has not been received, the method proceeds to 826 where the exchange rate update is retransmitted to the point of sale system. Otherwise, if it is determined that confirmation has been received the method then proceeds to 828.

At 828, transaction data is received, such as at the point of sale terminal or at a transaction processing system 112 from a point of sale terminal. The method then proceeds to 830. At 830 it is determined whether point of sale status change is required based on the transaction data, such as due to fraud indicators, unavailability of a multicurrency processing system 122, a change in merchant status, or other suitable status indicators. If it is determined that a point of sale terminal status change is not required the method proceeds to 834 and terminates. Otherwise the method proceeds to 832 where a point of sale status change is transmitted.

In operation, method 800 allows a point of sale system to be updated by a transaction processing system 112 to provide dynamic currency conversion processing capability. Method 800 allows point of sale systems to be updated, so as to be able to perform dynamic currency conversion in a manner that does not require a cardholder to be prompted for entry of currency codes or other information in which the cardholder may not have in his possession.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A system for multiple currency processing comprising:
a bank identifier system operating on one or more processors and determining whether a currency code has been selected for a card-issuing bank of a payment card for a transaction;
an alternate currency system operating on one or more processors and applying an alternate currency when processing the transaction if the currency code has not been selected for the card-issuing bank; and
a transaction processor system operating on one or more processors and configured to apply a currency associated with the currency code of the card-issuing bank of the payment card when processing the transaction if the currency code has been selected, and to apply the alternate currency if the currency code has not been selected.

2. The system of claim 1 wherein the one or more processors of the bank identifier system are the one or more processors of the alternate currency system.

3. The system of claim 1 wherein the one or more processors of the alternate currency system are the one or more processors of the transaction processor system.

4. The system of claim 1 wherein the one or more processors of the bank identifier system are the one or more processors of the transaction processor system.

5. The system of claim 1 wherein the one or more processors of the bank identifier system are the one or more processors of the alternate currency system and the one or more processors of the transaction processor system.

6. The system of claim 1 further comprising a point of sale status system changing a status of one or more point of sale systems to enable or disable multiple currency processing.

7. The system of claim 1 further comprising an alternate currency conversion eligible status system changing a status of one or more point of sale systems to enable or disable alternate currency conversion.

8. The system of claim 1 wherein the alternate currency system is configured to provide a transaction currency when the currency code is not available for the card-issuing bank.

9. The system of claim 1 wherein the bank identifier system further comprises a bank currency system configured to store one or more currency codes accepted by each card-issuing bank, to compare the currency code to each currency code accepted by the card-issuing bank of the presented card and to process the transaction in one of the currency codes accepted by the card-issuing bank when a match is found.

10. The system of claim 1 further comprising an exchange rate period system configured to store an exchange rate period and to compare a current time to the exchange rate period to determine whether to apply an exchange rate to the transaction.

11. A system for multiple currency processing comprising:
 a bank identifier system operating on one or more processors and configured to determine whether a currency transaction can be processed in a non-local currency using a payment card of a card issuing bank;
 a user interface control system operating on one or more processors and configured to generate a user-selectable control for selecting a local currency or the non-local currency;
 a transaction processor system operating on one or more processors and configured to process the transaction as a local currency transaction using the payment card of the card-issuing bank if the user selects the local currency and processing the transaction as a non-local currency transaction using the payment card of the card-issuing bank if the user selects the non-local currency.

12. The system of claim 11 wherein the transaction processor is further configured to:
 determine whether an exchange rate for the non-local currency code has expired; and
 process the transaction as the local currency transaction when the exchange rate has expired.

13. The system of claim 11 wherein the bank identifier system configured to determine whether the transaction can be processed in the non-local currency is performed at a point-of-sale terminal.

14. The system of claim 11 wherein the bank identifier system configured to determine whether the transaction can be processed in the non-local currency is performed at a remote transaction processing system.

15. The system of claim 11 wherein the bank identifier system is further configured to:
 determine whether the non-local currency is available at a point-of-sale terminal; and
 determine whether the non-local currency is available at a remote transaction processing system if it is determined that the non-local currency is not available at the point-of-sale terminal.

16. A system for processing transactions in an alternate currency comprising:
 a bank identifier system operating on one or more processors and configured to determine whether an alternate currency code has been selected for a card-issuing bank of a payment card for a transaction;
 a transaction processor system operating on or more processors and configured to process a transaction as a local currency transaction when the alternate currency code is not present and if a local currency code is present for the card-issuing bank of the payment card; and
 the transaction processor system further configured to process the transaction as an alternate currency transaction when the alternate currency code is present.

17. The system of claim 16 wherein the transaction processor system is further configure to:
 determine whether an exchange rate for the alternate currency code has expired; and
 process the transaction as the local currency transaction when the exchange rate has expired.

18. The system of claim 16 wherein the transaction processor system configured to determine whether the alternate currency code is present is performed at a point-of-sale terminal.

19. The system of claim 16 wherein the transaction processor system configured to determine whether the alternate currency code is present is performed at a remote transaction processing system.

20. The system of claim 16 wherein the bank identifier system is further configured to:
 determine whether the alternate currency code is present at a point-of-sale terminal; and
 determine whether the alternate currency code is present at a remote transaction processing system if it is not determined that the alternate currency code is present at a point-of-sale terminal.

* * * * *

UNITED STATES PATENT AND TRADEMARK OFFICE
CERTIFICATE OF CORRECTION

PATENT NO. : 10,115,160 B2  
APPLICATION NO. : 14/183381  
DATED : October 30, 2018  
INVENTOR(S) : Michael K. Nicholls et al.

Page 1 of 1

It is certified that error appears in the above-identified patent and that said Letters Patent is hereby corrected as shown below:

In the Claims

1. In Column 16, Line 20, in Claim 16, delete "on or more" and insert -- on one or more --, therefor.

2. In Column 16, Line 30, in Claim 17, delete "configure to:" and insert -- configured to: --, therefor.

Signed and Sealed this  
Sixth Day of August, 2019

Andrei Iancu  
*Director of the United States Patent and Trademark Office*